US011255976B2

United States Patent
Strobel et al.

(10) Patent No.: US 11,255,976 B2
(45) Date of Patent: Feb. 22, 2022

(54) METHOD FOR OPERATING A CORRECTION SERVICE SYSTEM AND CORRECTION SERVICE SYSTEM

(71) Applicant: Robert Bosch GmbH, Stuttgart (DE)

(72) Inventors: Jens Strobel, Freiberg Am Neckar (DE); Markus Langer, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 16/603,498

(22) PCT Filed: Mar. 1, 2018

(86) PCT No.: PCT/EP2018/055120
§ 371 (c)(1),
(2) Date: Oct. 7, 2019

(87) PCT Pub. No.: WO2018/188845
PCT Pub. Date: Oct. 18, 2018

(65) Prior Publication Data
US 2020/0049830 A1 Feb. 13, 2020

(30) Foreign Application Priority Data
Apr. 12, 2017 (DE) .......................... 102017206275.4

(51) Int. Cl.
*G01S 19/07* (2010.01)

(52) U.S. Cl.
CPC .......... *G01S 19/073* (2019.08); *G01S 19/072* (2019.08); *G01S 19/07* (2013.01)

(58) Field of Classification Search
CPC ....... G01S 19/073; G01S 19/07; G01S 19/072
(Continued)

(56) References Cited

U.S. PATENT DOCUMENTS

| 7,031,730 | B1* | 4/2006 | Barber | G01S 19/40 455/457 |
| 7,741,994 | B2* | 6/2010 | Pande | G01S 19/072 342/357.44 |

(Continued)

FOREIGN PATENT DOCUMENTS

| AU | 733187 B2 | 5/2001 |
| KR | 101212119 B1 | 12/2012 |

OTHER PUBLICATIONS

International Search Report for PCT/EP2018/055120, dated Jun. 13, 2018.
(Continued)

*Primary Examiner* — Chuong P Nguyen
(74) *Attorney, Agent, or Firm* — Norton Rose Fulbright US LLP; Gerard Messina

(57) ABSTRACT

A method for operating a correction service system (CSS), for a satellite navigation system (SNS), having reference-stations (RS) (in a coordinate-system (CS)) having known/fixed coordinates, the RS being operated to receive satellite signals, at least one correction-value (CV) being predefined as a function of the signals received by the selected RS and its coordinates, and is provided to user-devices of the SNS, the at least one CV being checked for plausibility. The CSS divides the CS into multiple-regions, in which user-devices determine an individual position as a function of the plausibility of the received CV, at least one specific-region being selected as a function of the plausibility of the CV, the specific-region(s) being assigned the at least one CV, at least one information-packet being generated, which contains indications about the plausibility of the CV and the specific-region(s), the information-packet(s) being provided to at least one selected group of user-devices.

12 Claims, 2 Drawing Sheets

(58) Field of Classification Search
USPC .................................................. 342/357.44
See application file for complete search history.

(56) References Cited

U.S. PATENT DOCUMENTS

| | | | | |
|---|---|---|---|---|
| 9,513,375 | B2* | 12/2016 | Moshfeghi | G01S 19/072 |
| 10,078,140 | B2* | 9/2018 | Drescher | G01S 19/072 |
| 10,551,505 | B2* | 2/2020 | Memarzadeh | G01S 19/08 |
| 10,641,902 | B2* | 5/2020 | Scot | G01S 19/40 |
| 10,690,775 | B2* | 6/2020 | Jokinen | G01S 19/072 |
| 10,782,414 | B2* | 9/2020 | Rougerie | G01S 19/25 |
| 2014/0009331 | A1* | 1/2014 | Tominaga | G01S 19/40 |
| | | | | 342/357.23 |
| 2015/0293233 | A1* | 10/2015 | De Jong | G01S 19/072 |
| | | | | 342/357.27 |
| 2019/0250276 | A1* | 8/2019 | Arnold | G01S 19/27 |
| 2019/0250278 | A1* | 8/2019 | Huck | G01S 19/14 |
| 2019/0339394 | A1* | 11/2019 | Limberger | G01S 19/07 |
| 2020/0096648 | A1* | 3/2020 | Zhou | G01S 19/07 |
| 2021/0116573 | A1* | 4/2021 | Strobel | G01S 19/073 |

OTHER PUBLICATIONS

Fujita Seigo et al., "Design of Integrity Function on Centimeter Level Augmentation Service (CLAS) in Japanese Quasi—Zenith Satellite System", GNSS 2016—Proceedings of the 29th International Technical Meeting of the Satellite Division of the Institute of Navigation (ION GNSS+ 2016), The Institute of Navigation, 8551 Rixlew Lane Suite 360 Manassas, VA 20109, USA, 2016, pp. 3258-3263, XP056013671.

* cited by examiner

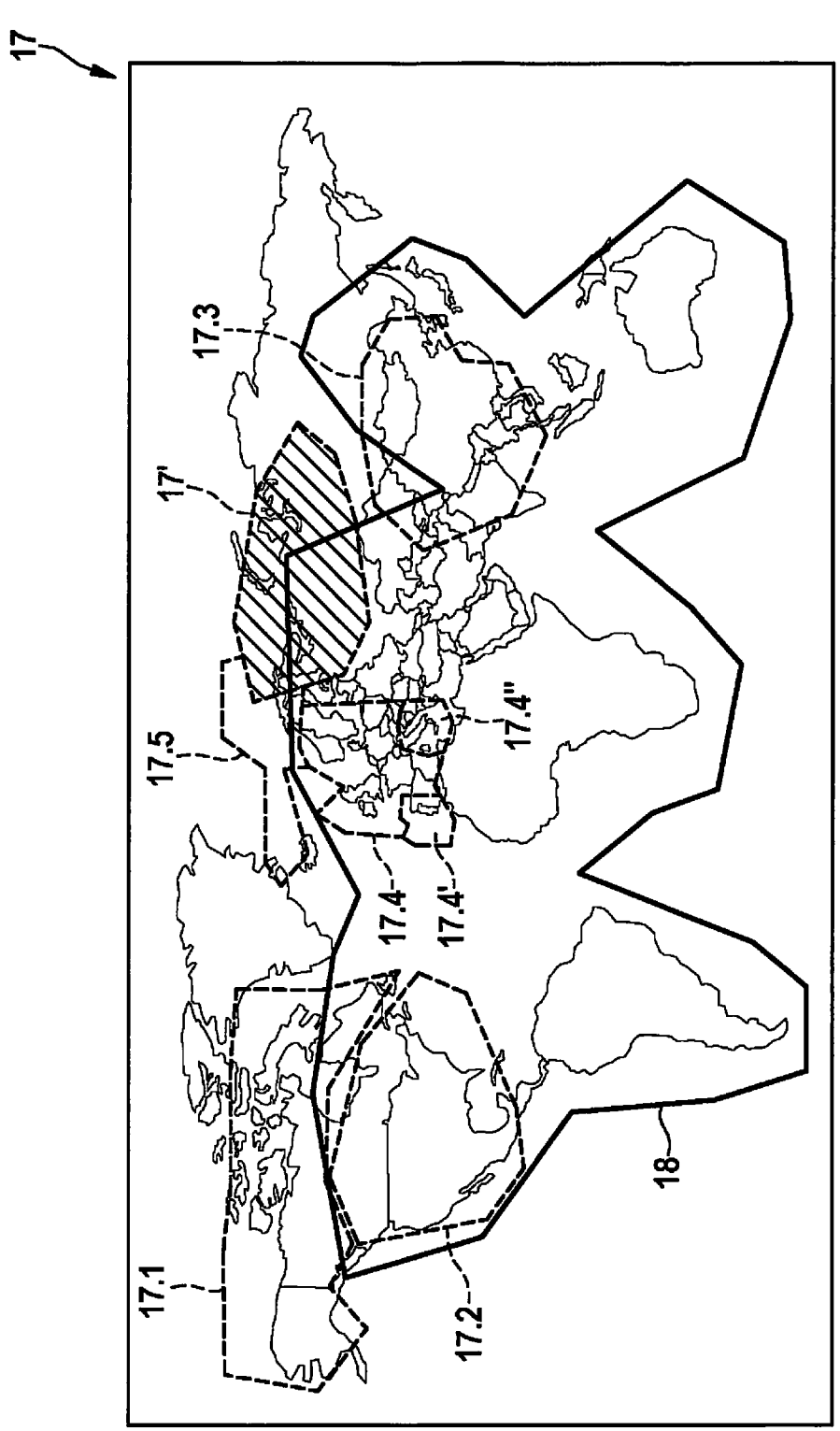

METHOD FOR OPERATING A CORRECTION SERVICE SYSTEM AND CORRECTION SERVICE SYSTEM

FIELD OF THE INVENTION

The present invention relates to a method for operating a correction service system and a correction service system.

BACKGROUND INFORMATION

Global navigation satellite systems (GNSS) make it possible to determine the position of a user device, for example, of a navigation system, in a coordinate system. In these systems, the propagation times of received satellite signals of satellites of the global navigation satellite system are ascertained with the aid of the user device, from which distances between the respective satellites and the user device are derived. The transmission speed of the satellite signals is normally assumed to be speed of light. Disturbances occurring during the transmission, for example, due to specific conditions in the ionosphere or in the troposphere, result in, among other things, changes in propagation time, as a result of which errors in the position determination may result. To account for such disturbances, correction services are known, which ascertain with the aid of an existing network of stationary reference stations, deviations between coordinates ascertained with the aid of satellite signals and known coordinates of the respective reference station, derive correction values and provide these correction value to the user devices. It is intended with the aid of the correction values to correct errors of the type described during the position determination of the user devices. The disadvantage is that no pieces of information or only limited pieces of information regarding an integrity of the correction values, in particular, a plausibility of the same, are provided. Nor are these pieces of information provided on a region-specific basis. This results in an uncertainty in the results of the position determination, in particular, in the lack of a connection of pieces of integrity information for specific regions. This is problematical, in particular, in conjunction with safety-critical applications of the global navigation satellite system.

SUMMARY OF THE INVENTION

An object of the present invention is to provide a method for operating a correction service system and a correction service system, in which the aforementioned disadvantages do not occur.

The object may be achieved by providing the subject matter of the descriptions herein. Advantageous embodiments result from the further descriptions herein.

The object may be achieved, in particular, by providing a method for operating a correction service system for a satellite-based navigation system, the correction system including multiple reference stations in a coordinate system, the reference stations having known and fixed coordinates. In this method, the multiple reference stations are operated in order to receive satellite signals of multiple satellites of the satellite-based navigation system. At least one correction value is then predefined as a function of satellite signals received by at least one selected reference station of the multiple reference stations and of the known coordinates of the at least one selected reference stations, and provided to multiple user devices of the satellite-based navigation system. The at least one correction value is checked for plausibility. The correction service system according to the present invention divides the coordinate system into multiple regions, in which the multiple user devices are each able to determine an individual position as a function of the received at least one correction value. In the process, at least one specific region is selected from the multiple regions as a function of the plausibility of the at least one correction value, the at least one specific region being assigned the at least one correction value. In conjunction with the method according to the present invention, at least one information packet is generated, which contains at least indications about the plausibility of the at least one correction value and about the at least one specific region. The at least one information packet is then provided to at least one selected group of the multiple user devices. The method yields advantages over the related art. Because the at least one information packet contains at least indications about the plausibility, in particular, a lack of plausibility, of the at least one correction value and about the at least one specific region, the at least one selected group of the multiple user devices, which in particular, is affected by a disruption in the satellite-based navigation system or by the correction service system resulting in a lack of plausibility of the at least one correction value, may be informed accordingly. In this way, a piece of information about a lack of plausibility of the at least one correction value may be provided in the at least one specific region with the aid of the at least one information packet, the at least one correction value may continue to be utilized for position determination in regions other than the at least one specific region. Thus, it is, in particular, not necessary to characterize with the aid of the at least one information packet the at least one correction value as not plausible in a global region. Moreover, it may be provided to provide the at least one information packet specifically to the selected group of the multiple user devices, whereby a provision of the at least one information packet to all user devices, in particular, regardless of a relevance of the information packet to the same may be avoided. Instead, the use of the at least one correction value merely for the at least one specific region may be characterized as critical, in which the at least one correction value is increasingly likely to lead to an erroneous position determination result, in particular, in the selected group of the multiple user devices. On the whole, it is possible with the aid of the correction service system to significantly enhance the certainty, accuracy and availability of the position determination via user devices.

The multiple reference stations may be configured as stationary reference stations, which are situated, in particular, within a global network and/or within a local network of reference stations. The multiple user devices may be each configured as a navigation device in a motor vehicle, mobile telephone, tablet computer, wearable, a mobile unit or in some other form. The at least one correction value may be used to compensate for errors within the correction service system and/or within the satellite-based navigation system, which have, in particular, only a local impact or which impact a specific region. The at least one correction value may be used to compensate for ionospheric and/or tropospheric disturbances, in particular, in the satellite-based navigation system, scintillation, influences of solar winds, sudden ionospheric disturbance (SID), polar cap absorption (PCA), ionospheric storms, and/or traveling ionic disturbances (TID), in particular, being taken into account. Each individual disturbance may be assigned at least one correction value, such atmospheric disturbances, in particular, being assigned a specific correction value. Other types of disturbances may be assigned additional correction values.

On the whole, each individual disturbance or each group of disturbances may be each assigned at least one correction value. It is possible, in particular, that the received at least one correction value is further processed in each case by the multiple user devices, the multiple user devices each being able to determine an individual position as a function of the further processed correction value. A lack of plausibility of the at least one correction value results, in particular, when defects exist at one or at multiple reference stations, the known and fixed coordinates of one or of multiple of the reference stations have been altered, for example, due to an earthquake or problems exist in data processings, which are used, in particular, for ascertaining the at least one correction value. A lack of plausibility of the at least one correction value may be related, in particular, also to disturbances in the ionosphere and/or in the troposphere. The at least one correction value may be characterized with the aid of the at least one information packet as not plausible for the at least one specific region. The at least one specific region may then, in particular, be connected with a defective reference station, erroneous known and fixed coordinates of a reference station or an erroneous data processing. In one specific embodiment of the method according to the present invention, one or multiple reference stations of the multiple reference stations are checked for plausibility of correction values, which are generated—in particular with the aid of data processing—as a function of data provided by the respective reference station. The multiple regions may be geographical regions, thus, areas in the coordinate system. The at least one information packet may contain indications about the at least one specific region, a corresponding area being indicated in the coordinate system in the at least one information packet. The at least one information packet may be provided to a selected group having more than one user device of the multiple user devices. The at least one information packet, together with the at least one correction value, is provided, in particular, to the selected group of the multiple user devices, a shared data stream may be generated for transmitting the at least one correction value and the at least one information packet. Alternatively, it may be provided that the at least one information packet is provided to all user devices of the satellite-based navigation system.

According to one specific embodiment of the method according to the present invention, the multiple reference stations are each assigned to at least one of the multiple regions. One of the multiple reference stations is assigned to one of the multiple regions, in particular, when two or more of the multiple regions intersect, these reference stations being located within the area of intersection. The at least one correction value may be assigned to the at least one region as a function of the at least one selected reference station, with the aid of which the at least one correction value is ascertained—for example, with the aid of a data processing. In this way, a simple and reliable ascertainment of one or of multiple regions, in which disruptions during position determination are to be expected with increased likelihood, may be implemented.

The at least one specific region may be determined as a function of the known and fixed coordinates of the at least one selected reference station. The at least one specific region may, in particular, be an area that surrounds the at least one selected reference station. The known and fixed coordinates may be assigned a geographical location of the at least one selected reference station. This geographical location may particularly be an area, in which correction values are ascertained with the aid of the at least one reference station, with the aid of which a position determination of user devices is at least improved or first made possible. In this way, a simple and reliable ascertainment of one or of multiple regions, in which impediments to position determination are to be expected, is made possible.

It may be further provided that the selected group of the multiple user devices is assigned user devices that are located in the at least one specific region or that move in the direction of the at least one specific region. The selected group of the multiple user devices is assigned, in particular, user devices, for which the plausibility of the at least one correction value is relevant for their position determination. The at least one information packet may thus be advantageously provided to those user devices, for which the information packet is relevant for the determination of their position.

According to another specific embodiment of the method, the at least one information packet contains a first use recommendation for the selected group of the multiple user devices, in order to instruct the selected group of the multiple user devices when determining the individual position of each to take into account the plausibility of the at least one correction value, in particular, a lack of plausibility of the at least one correction value. It may be provided that the selected group of the multiple user devices is instructed to carry out the determination of each individual position without the at least one correction value.

In conjunction with a method for operating a satellite-based navigation system also claimed, a user device of the selected group, in particular, an operator of the user device, may decide in each case as a function of the at least one information packet whether or to what extent the at least one correction value is used in determining in each case the individual position. It is, in particular, also possible to use the at least one correction value with a reduced weighting in the position determination, which may be as a function of an accuracy of the correction value to be expected. Alternatively, it may be provided in such case that a decision is made in an automated or semi-automated manner about the use of the at least one correction value in determining in each case the individual position of a user device of the selected group of the multiple user devices as a function of the at least one information packet. In this case, the at least one correction value may be excluded or at least used with a reduced weighting when determining the individual position of each user device of the selected group of the multiple user devices. The use of the at least one correction value in this case may be particularly suspended or at least carried out with a reduced weighting in the at least one specific region when determining each individual position of a user device of the selected group of the multiple user devices. It may be further provided in this case that the selected group of the multiple user devices suspends a use of selected orbit data or clock data of the multiple satellites, satellite signals of the multiple satellites or other input variables required for position determination as a function of the at least one information packet. In this way, the reliability and accuracy of the position determination is effectively increased by the user devices, in particular, in the satellite-based navigation system.

In the method for operating a correction service system, at least one selected satellite of the multiple satellites of the satellite-based navigation system and/or at least one selected constellation of the multiple satellites of the satellite-based navigation system is/are ascertained, which is/are assigned to the at least one correction value. The at least one information packet in this case may contain a second use recommendation for the selected group of the multiple user devices, in order to instruct the selected group of the multiple user devices to take the plausibility of the at least one selected satellite and/or of the correction values assigned to at least one selected constellation into account when determining the individual position of each. The at least one selected constellation of the multiple satellites may, in particular, be a group of the multiple satellites. The at least one selected satellite and/or the at least one selected constellation is assigned the at least one correction value, in particular, via the satellite signals, which are provided with the aid of the at least one selected satellite and/or of the at least one selected constellation for determining the at least one correction value. The at least one selected satellite or the at least one selected constellation are, in particular, satellites or constellations, which are error-prone and which effectuate—for example, by emitting or forwarding erroneous satellite signals—a lack of plausibility of the correction values ascertained as a function of these satellite signals. It may be provided to use the correction values assigned to the at least one selected satellite and/or the at least one selected constellation at least with a reduced weighting or to suspend a use of the same completely during the position determination.

In conjunction with the method for operating a satellite-based navigation system also claimed, the use of the at least one selected satellite and/or of the at least one selected constellation may be suspended in the at least one specific region. In this case, the use of the at least one selected satellite and/or of the at least one selected constellation may be globally suspended when determining the individual position of each of the selected group of the multiple user devices. A suspension of the use of the at least one selected satellite and/or of the at least one selected constellation in this case may be carried out manually, in a semi-automated or automated manner. In this way, the reliability and accuracy of the position determination by the user devices, in particular, in the satellite-based navigation system, is effectively increased.

According to one specific embodiment of the method for operating a correction service system, atmospheric disturbances are ascertained, which influence the transmission of the satellite signals assigned to the at least one correction value. In the process, indications regarding the atmospheric disturbances may be provided to the selected group of the multiple user devices via the at least one information packet. The satellite signals assigned to the at least one correction value may be satellite signals that are transmitted by one or by multiple satellites of the multiple satellites to the at least one selected reference station, at least one correction value being ascertained as a function of these satellite signals. In conjunction with the method according to the present invention, the at least one information packet includes, in particular, indications regarding a spatial distribution, a point in time and/or a time duration of, in particular, atmospheric disturbances. In this way, it is possible to provide the selected group of the multiple user devices a valid basis for a decision on the use of the at least one correction value for position determination.

The at least one correction value may be predefined as a function of satellite signals received by at least multiple selected reference stations of the multiple reference stations and of the known coordinates of the at least multiple selected reference stations, and is provided to the multiple user devices of the satellite-based navigation system. The at least one correction value may be further predefined as a function of satellite signals received from all reference stations and of the known coordinates of all reference stations and is provided to the multiple user devices of the satellite-based navigation system.

It may be further provided that the at least one information packet is provided to the selected group of the multiple user devices with the aid of at least one communication satellite, alternatively or in addition, with the aid of a mobile communication network. The at least one communication satellite may be one satellite of the multiple satellites of the satellite-based navigation system. The communication satellite may alternatively also differ from the multiple satellites of the satellite-based navigation system. With the aid of the mobile communication network, a two-way communication between the selected group of the multiple user devices and a unit, in particular, a data processing, which generates the at least one information packet, is implemented. With the aid of a mobile communication network configured in this way, it is possible, in particular, to evaluate specific navigation data, for example, the location or destination of a respective user device of the multiple user devices and, as a function thereof, to provide the at least one information packet specifically to user devices of the selected group of the multiple user devices. In this way, the provision of the at least one information packet to user devices for which the information packet has no relevance may, in particular, be avoided. By utilizing existing resources, in particular, existing satellites and/or existing mobile communication networks to provide the at least one information packet for the selected group of the multiple user devices, it is possible to reduce the costs of the method according to the present invention.

The method according to the present invention for operating a satellite-based navigation system including the features of Claim 10 also yields the aforementioned advantages. The satellite-based navigation system in this case includes multiple satellites, multiple user devices and a correction service system having reference stations in a coordinate system, the reference stations including multiple known and fixed coordinates. In conjunction with the method, the multiple reference stations are operated in order to receive satellite signals of the multiple satellites of the satellite-based navigation system. In this method, at least one correction value is predefined as a function of satellite signals received from at least one selected reference station of the multiple reference stations and of the known coordinates of the at least one selected reference station and is provided to the multiple user devices of the satellite-based navigation system. The at least one correction value in this case is checked for plausibility. The correction service system divides the coordinate system into multiple regions, in which the multiple user devices each determine an individual position as a function of the received at least one correction value. The correction service system in this case is operated by the previously described method according to the present invention for operating a correction service system.

A correction service system of the type described below may be operated with the aid of the above described method for operating a correction service system.

The correction service system according to the present invention including the features described herein also yields the aforementioned advantages. It includes multiple reference stations, which have known and fixed coordinates. The correction service system according to the present invention is configured to carry out a method for operating a correction service system of the type described above. For this purpose, programmed control units, which may be assigned to each device for activating the multiple reference stations of the correction service system, are present, in particular, for carrying out the method according to the present invention. Control units programmed for carrying out the method according to the present invention may be also present for activating additional units required or advantageous for the correction service system according to the present invention.

A satellite-based navigation system of the type described below may be operated with the aid of the above described method for operating a satellite-based navigation system.

The satellite-based navigation system according to the present invention including the features described herein also yields the aforementioned advantages. It includes multiple satellites, multiple user devices and at least one correction service system of the type described above. The satellite-based navigation system according to the present invention is configured to carry out a method for operating a satellite-based navigation system of the type described above. For this purpose, control units programmed, in particular, to carry out the method according to the present invention are present, which may be assigned to each device for activating the multiple satellites, the multiple user devices and the multiple reference stations of the at least one correction service system according to the present invention. Control units programmed for carrying out the method according to the present invention may be also present for activating additional devices required or advantageous for the satellite-based navigation system according to the present invention.

The present invention is explained in greater detail below with reference to the drawings.

BRIEF DESCRIPTION OF THE DRAWINGS

FIG. 2 schematically shows a representation of regions in conjunction with the exemplary embodiment of the advantageous correction service system.

DETAILED DESCRIPTION

Figure 1:
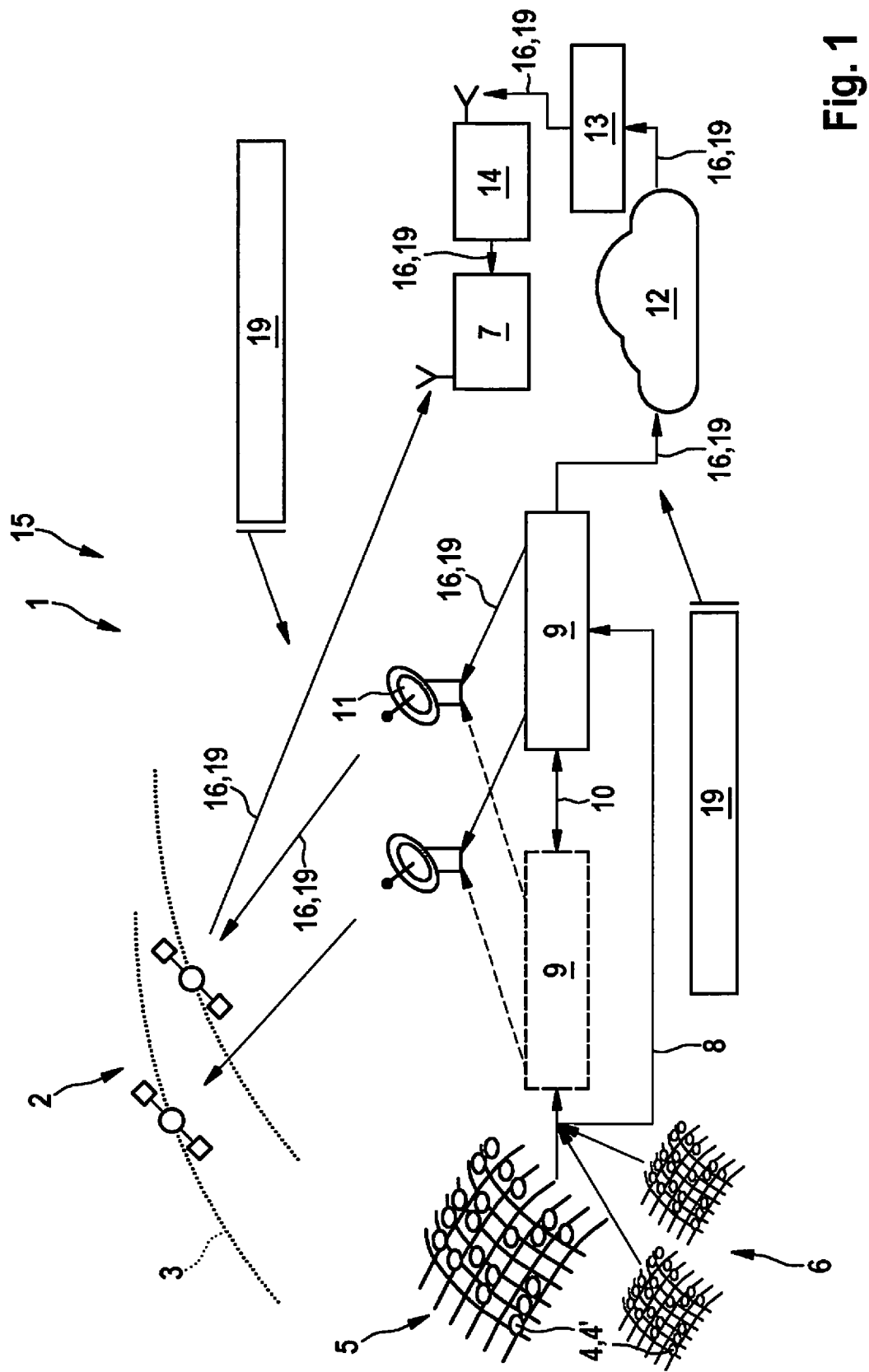
FIG. 1 schematically shows a representation of one exemplary embodiment of an advantageous correction service system.

FIG. 1 schematically shows a representation of one exemplary embodiment of an advantageous correction service system 1. Correction service system 1 is located in a coordinate system. Correction service system 1 may include at least one—here two—communication satellites 2. Communication satellites 2 each move in a satellite orbit 3. It may be provided that a communication satellite 2 is assigned in each case to a geographical area, in particular, to a continent.

Correction service system 1 further includes multiple reference stations 4, which have known and fixed coordinates. Multiple reference stations 4 in the exemplary embodiment depicted in FIG. 1 are, in particular, reference stations in a global network 5 of reference stations 4 and reference stations in multiple local networks 6 of reference stations 4.

Also depicted in FIG. 1 is a user device 7 of a satellite-based navigation system, which is exemplary of multiple user devices 7 of the satellite-based navigation system. In the exemplary embodiment depicted in FIG. 1, data packets 8 including pieces of information for ascertaining correction values or including already ascertained correction values are provided with the aid of reference stations 4 for a data processing 9—here two data processings 9. A communication between data processings 9 may be implemented among each other, data packets 8 may be checked for consistency, represented by arrow 10. Data processings 9 are each communicationally linked to transmission stations 11, here two transmitting stations 11, respectively. One communication link each may be implemented between data processings 9 and communication satellites 2 with the aid of transmission stations 11. Data processings 9 may each include a communication link to a backend server 12. Backend server 12 in this exemplary embodiment is communicationally linked to a mobile communication network 13. Mobile communication network 13 is communicationally linked here, in particular, in a wireless manner to a communication module 14, which may be assigned in each case to one of multiple user devices 7. In this exemplary embodiment, a communication module 14 is communicationally linked in each case to one of the multiple user devices 7. Multiple user devices 7 may be communicationally linkable, particularly communicationally linked in each case to communication satellites 2.

Also depicted in FIG. 1 is satellite-based navigation system 15, which includes multiple satellites—not depicted here—, the multiple user devices 7 and the at least one—here one—correction service system 1.

Correction service system 1 is configured to carry out a method for operating a correction service system 1 of the type described below.

Correction service system 1, including multiple reference stations 4 in a coordinate system, the reference stations having known and fixed coordinates, is operated with the aid of the advantageous method for operating a correction service system 1. In this method, multiple reference stations 4 are operated in order to receive satellite signals of the multiple satellites of satellite-based navigation system 15. The multiple satellites in another exemplary embodiment not depicted here are configured as communication satellites 2. In this case, at least one correction value 16 is predefined as a function of satellite signals received from at least one selected reference station 4' of the multiple reference stations 4 and of the known coordinates of the at least one selected reference station 4', and is provided to multiple user devices 7 of satellite-based navigation system 15. In the exemplary embodiment of the correction service system 1 depicted in FIG. 1, the at least one correction value 16 is ascertained with the aid of data processings 9 as a function of data packets 8 provided by reference stations 4. The at least one correction value 16 is provided to multiple user devices 7, in particular, transmitted to multiple user devices 7 via transmitting stations 11 and communication satellites 2. It is possible, in particular, that multiple user devices 7 further process in each case the at least one correction value 16, a determination of the individual position of each of multiple user devices 7 being carried out as a function of further processed correction value 16. In this exemplary embodiment, the at least one correction value 16 may be provided, in particular, sent in parallel to multiple user devices 7 via backend server 12, mobile communication network 13 and communication module 14 assigned to each of multiple user devices 7. Multiple user devices 7 may receive at least one correction value 16 either from communication satellites 2 or via mobile communication network 13, so that a reliable provision of multiple user devices 7 with the at least one correction value 16 is ensured.

The at least one correction value 16 is checked for plausibility in conjunction with the advantageous method.

FIG. 2 schematically shows a representation of regions 17 in conjunction with advantageous correction service system 1 and advantageous satellite-based navigation system 15. FIG. 2 in this case shows a first region 17.1, a second region 17.2, a third region 17.3, a fourth region 17.4, and a fifth region 17.5. It may be provided to provide one or multiple sub-regions within a region 17. Fourth region 17.4 accordingly includes here two sub-regions 17.4' and 17.4". A global area 18 according to FIG. 2 may be also provided. Global area 18 in the exemplary embodiment depicted here encompasses at least parts of first region 17.1, of second region 17.2, of third region 17.3, of fourth region 17.4, and of fifth region 17.5. In addition, FIG. 2 shows a region 17 formed as specific region 17', which is adversely affected by a disturbance in the ionosphere and/or in the troposphere. A disturbance in the ionosphere and/or in the troposphere may, in particular, be present and may adversely affect a transmission of satellite signals to user devices 7. Such a disturbance may, in particular, adversely affect a generation and/or provision of the at least one correction value 16, in particular, for specific region 17'. Alternatively or in addition, a disruption may be present in the form of a defect at a reference station 4, a change of the known and fixed coordinates of a reference station 4, for example, due to an earthquake, or in the form of problems in a data processing 9. A generation and/or provision of the at least one correction value 16 is, in particular, adversely affected as a result, in particular, for specific region 17'. Ultimately, a provision which may be of correct correction values 16 for position determination, in particular, is not possible then or not completely possible in the at least one specific region 17'.

Correction service system 1 divides the coordinate system into multiple of the mentioned regions 17, in which multiple user devices 7 may each be able to determine an individual position as a function of the received at least one correction value 16. The at least one specific region 17' is selected from multiple regions 17 as a function of the plausibility of the at least one correction value 16, in particular, if the at least one correction value 16 exhibits a lack of plausibility, the at least one specific region 17' being assigned the at least one correction value 16. At least one information packet 19—which is schematically depicted in FIG. 1—is generated in conjunction with the advantageous method for operating a correction service system 1, which contains at least indications about the plausibility, in particular, about a lack of plausibility, of the at least one correction value 16 and the at least one specific region 17'. In this case, the at least one information packet 19 is provided to at least one selected group of multiple user devices 7.

In the exemplary embodiment depicted in FIG. 1, the at least one information packet 19, together with the at least one correction value 16, is provided to the selected group of multiple user devices 7. The at least one information packet 19 in the exemplary embodiment depicted in FIG. 1 may be generated with the aid of data processings 9. The at least one information packet 19 may be provided to the selected group of multiple user devices 7, in particular, sent to the selected group of multiple user devices 7, via transmitting stations 11 and communication satellites 2. Alternatively or in addition, the at least one information packet 19 may be provided to the selected group of multiple user devices 7, in particular, sent to the selected group of multiple user devices 7, via backend server 12, mobile communication network 13 and communication module 14. The at least one information packet 19 may be provided, particularly, sent to the selected group of multiple user devices 7 in a shared data stream with the at least one correction value 16.

In another exemplary embodiment, the at least one information packet 19 is generated in a different way, in particular, not with the aid of a data processing 9. The at least one information packet 19 is provided to the selected group of multiple user devices 7 which may be separate from the at least one correction value 16.

Multiple reference stations 4 may be each assigned to one of multiple regions 17, the at least one correction value 16 being ascertained as a function of the at least one selected reference station 4', with the aid of which the at least one correction value 16 is ascertained, which is assigned at least one specific region 17'.

It may be further provided that the at least one specific region 17' is determined as a function of the known and fixed coordinates of the at least one selected reference station 4'.

The selected group of multiple user devices 7 may be assigned user devices 7 that are located in the at least one specific region 17' or which move in the direction of the at least one specific region 17'. It may be provided to characterize a plausibility—in particular, a lack of plausibility—of the at least one correction value 16, in each case regionally specifically, with the aid of the at least one information packet 19. Characterizing the at least one correction value 16 in global area 18—in particular, undifferentiated according to regions, as not plausible may then be avoided unless global area 18 is affected as a whole by disturbances of the type described. Alternatively or in addition, it is provided, in particular, that the at least one information packet 19 is not provided in overall global area 18 to multiple user devices 7 located there unless global area 18 as a whole is affected by disruptions of the type described.

The at least one information packet 19 may contain a first use recommendation for the selected group of multiple user devices 7, in order to instruct the selected group of multiple user devices 7 to take the plausibility of the at least one correction value 16 into account, in particular, in the case of a lack of plausibility of the same, when determining the individual position of each.

It may be further provided that at least one selected satellite of the multiple satellites of the satellite-based navigation system 15 and/or at least one selected constellation of the multiple satellites of the satellite-based navigation system 15 is/are ascertained, which are assigned to at least one correction value 16. The at least one information packet 19 may contain a second use recommendation for the selected group of multiple user devices 7, in order to instruct the selected group of multiple user devices 7 to take the plausibility of the corrections values of at least one selected satellite and/or of the at least one selected constellation into account when determining the individual position of each, a use of such correction values having a lack of plausibility, in particular, being prevented or being carried out with a reduced weighting of the same.

It may be further provided that atmospheric disturbances are ascertained, which influence the transmission of the satellite signals assigned to the at least one correction value 16, and which result, in particular, in a lack of plausibility of the at least one correction value 16 ascertained with the aid of these satellite signals, indications regarding the atmospheric disturbances of the selected group of multiple user devices 7 being provided by the at least one information packet 19.

In another exemplary embodiment, it is provided that the at least one correction value 16 is predefined as a function of satellite signals received by at least multiple selected reference stations 4' of multiple reference stations 4, in particular, of all reference stations 4 and of the known coordinates of the at least multiple selected reference stations 4', in particular, of all reference stations 4, and is provided to multiple user devices 7 of the satellite-based navigation system 15.

It may be further provided that the at least one information packet 19 is provided to the selected group of multiple user devices 7 with the aid of at least one communication satellite 2 and/or of a mobile communication network 13.

The satellite-based navigation system 15 is configured to carry out a method for operating a satellite-based navigation system 15 of the type described below.

Satellite-based navigation system 15 in this case includes the multiple satellites, multiple user devices 7 and correction service system 1, which encompasses multiple reference stations 4 in a coordinate system, the reference stations having known and fixed coordinates. In conjunction with the method for operating a satellite-based navigation system 15, multiple reference stations 4 are operated in order to receive satellite signals of the multiple satellites of the satellite-based navigation system 15. In the process, the at least one correction value 16 is predefined as a function of satellite signals received by the at least one selected reference station 4' of multiple reference stations 4 and of the known coordinates of the at least one selected reference station 4' and is provided to multiple user devices 7 of the satellite-based navigation system 15. In the process, the at least one correction value 16 is checked for plausibility. In conjunction with the method for operating a satellite-based navigation system 15, correction service system 1 is operated with the aid of a method for operating a correction service system 1 of the type described above.

On the whole, it is evident that the reliability, accuracy and availability of the determination of the respective position of multiple user devices 7 may be effectively and cost-efficiently enhanced with the aid of the method for operating correction service system 1, of the method for operating satellite-based navigation system 15, of correction service system 1 and of satellite-based navigation system 15.

What is claimed is:

1. A method for operating a correction service system for a satellite-based navigation system, the method comprising:
   operating multiple reference stations to receive satellite signals of multiple satellites of the satellite-based navigation system, wherein the correction service system includes the multiple reference stations in a coordinate system, the reference stations having known and fixed coordinates; and
   predefining at least one correction value as a function of satellite signals received by at least one selected reference station of the multiple reference stations and of the known coordinates of the at least one selected reference station, and providing the at least one correction value to multiple user devices of the satellite-based navigation system;
   wherein the correction service system divides the coordinate system into multiple regions, in which the multiple user devices are each able to determine an individual position as a function of the received at least one correction value,
   wherein at least one specific region is selected from the multiple regions as a function of a plausibility of the at least one correction value,
   wherein the at least one specific region is assigned the at least one correction value,
   wherein at least one information packet is generated, which contains indications about the plausibility of the at least one correction value and about the at least one specific region, and
   wherein the at least one information packet is provided to a selected group of the multiple user devices.

2. The method of claim 1, wherein the multiple reference stations are each assigned to at least one of the multiple regions, and wherein the at least one correction value is assigned to the at least one specific region as a function of the at least one selected reference station.

3. The method of claim 1, wherein the at least one specific region is determined as a function of the known and fixed coordinates of the at least one selected reference station.

4. The method of claim 1, wherein the selected group of the multiple user devices is assigned user devices that are located in the at least one specific region or which move in the direction of the at least one specific region.

5. The method of claim 1, wherein the at least one information packet contains a first use recommendation for the selected group of the multiple user devices, to instruct the selected group of the multiple user devices to take the plausibility of the at least one correction value into account when determining the individual position of each.

6. The method of claim 1, wherein at least one selected satellite of the multiple satellites of the satellite-based navigation system and/or at least one selected constellation of the multiple satellites of the satellite-based navigation system is/are ascertained, which are assigned to the at least one correction value, and wherein the at least one information packet containing a second use recommendation for the selected group of the multiple user devices, in order to instruct the selected group of the multiple user devices to take the plausibility of the correction values assigned to the at least one selected satellite and/or to the at least one selected constellation into account when determining the individual position of each.

7. The method of claim 1, wherein atmospheric disturbances, which influence the transmission of the satellite signals assigned to the at least one correction value, are ascertained, indications regarding the atmospheric disturbances being provided via the at least one information packet to the selected group of the multiple user devices.

8. The method of claim 1, wherein the at least one correction value is predefined as a function of satellite signals received by at least multiple selected reference stations of the multiple reference stations, in particular, by all reference stations and of the known coordinates of the at least multiple selected reference stations, in particular, of all reference stations and is provided to the multiple user devices of the satellite-based navigation system.

9. The method of claim 1, wherein the at least one information packet is provided to the selected group of the multiple user devices with the at least one communication satellite and/or a mobile communication network.

10. A method for operating a satellite-based navigation system, which includes multiple satellites, multiple user devices and a correction service system, the method comprising:
   operating multiple reference stations to receive satellite signals of the multiple satellites of the satellite-based navigation system, wherein the correction service system includes the multiple reference stations in a coordinate system, the reference stations having known and fixed coordinates; and
   predefining at least one correction value as a function of satellite signals received by at least one selected reference station of the multiple reference stations and of the known coordinates of the at least one selected reference station, and providing the at least one correction value to the multiple user devices of the satellite-based navigation system, wherein the correction service system divides the coordinate system into multiple regions, in which the multiple user devices are each able to determine an individual position as a function of the received at least one correction value, wherein at least one specific region is selected from the multiple regions as a function of the plausibility of the at least one correction value, wherein the at least one specific region is assigned the at least one correction value, wherein at least one information packet is generated, which contains at least indications about a plausibility of the at least one correction value and about the at least one specific region, and wherein the at least one information packet is provided to a selected group of the multiple user devices.

11. A correction service system, comprising:
multiple reference stations in a coordinate system, the reference stations having known and fixed coordinates;
wherein the correction service system, which includes the multiple reference stations in a coordinate system, the reference stations having known and fixed coordinates, is configured to perform the following:
  operating the multiple reference stations to receive satellite signals of multiple satellites of the satellite-based navigation system; and
  predefining at least one correction value as a function of satellite signals received by at least one selected reference station of the multiple reference stations and of the known coordinates of the at least one selected reference station, and providing the at least one correction value to multiple user devices of the satellite-based navigation system;
  wherein the correction service system divides the coordinate system into multiple regions, in which the multiple user devices are each able to determine an individual position as a function of the received at least one correction value,
  wherein at least one specific region is selected from the multiple regions as a function of the plausibility of the at least one correction value,
  wherein the at least one specific region is assigned the at least one correction value,
  wherein at least one information packet is generated, which contains at least indications about a plausibility of the at least one correction value and about the at least one specific region, and
  wherein the at least one information packet is provided to a selected group of the multiple user devices.

12. A satellite-based navigation system, comprising:
multiple satellites;
multiple user devices; and
at least one correction service system, including multiple reference stations in a coordinate system, the reference stations having known and fixed coordinates;
wherein the correction service system, which includes the multiple reference stations in a coordinate system, the reference stations having known and fixed coordinates, is configured to perform the following:
  operating the multiple reference stations to receive satellite signals of the multiple satellites of the satellite-based navigation system; and
  predefining at least one correction value as a function of satellite signals received by at least one selected reference station of the multiple reference stations and of the known coordinates of the at least one selected reference station, and providing the at least one correction value to the multiple user devices of the satellite-based navigation system;
  wherein the correction service system divides the coordinate system into multiple regions, in which the multiple user devices are each able to determine an individual position as a function of the received at least one correction value,
  wherein at least one specific region is selected from the multiple regions as a function of the plausibility of the at least one correction value,
  wherein the at least one specific region is assigned the at least one correction value,
  wherein at least one information packet is generated, which contains at least indications about a plausibility of the at least one correction value and about the at least one specific region, and
  wherein the at least one information packet is provided to a selected group of the multiple user devices.

* * * * *